United States Patent [19]

Buonanno

[11] 4,377,893
[45] Mar. 29, 1983

[54] APPARATUS AND METHOD FOR ALIGNING A WEATHERSTRIP GUIDEWAY WITH A RECEIVING SLOT

[75] Inventor: Samuel S. Buonanno, Fairport, N.Y.

[73] Assignee: Schlegel Corporation, Rochester, N.Y.

[21] Appl. No.: 220,411

[22] Filed: Dec. 29, 1980

[51] Int. Cl.³ .................... B23P 19/02; B23P 19/04
[52] U.S. Cl. .................................. 29/417; 29/235; 29/241; 29/433; 29/464
[58] Field of Search ............... 29/234, 235, 241, 417, 29/433, 451, 464, 468

[56] References Cited

U.S. PATENT DOCUMENTS

| 927,696 | 7/1909 | Vanvactor | 29/433 |
| 1,839,429 | 1/1932 | Weaver | 29/235 |
| 1,984,350 | 12/1934 | Halsey et al. | 29/468 |
| 2,924,007 | 2/1960 | Wrightfield | 29/235 X |
| 3,027,629 | 4/1962 | Wrightfield | 29/235 |
| 3,335,487 | 8/1967 | Ellenberg et al. | 29/235 |
| 4,308,653 | 1/1982 | Hinton et al. | 29/235 |

Primary Examiner—Ervin M. Combs
Attorney, Agent, or Firm—Cumpston & Shaw

[57] ABSTRACT

An apparatus and method for aligning a weatherstrip receiving slot in a receiving member, such as a door or window member, with the exit opening of a guideway. A weatherstrip fed by any suitable means through the guideway is inserted directly through the exit opening into the aligned receiving slot of the receiving member.

8 Claims, 3 Drawing Figures

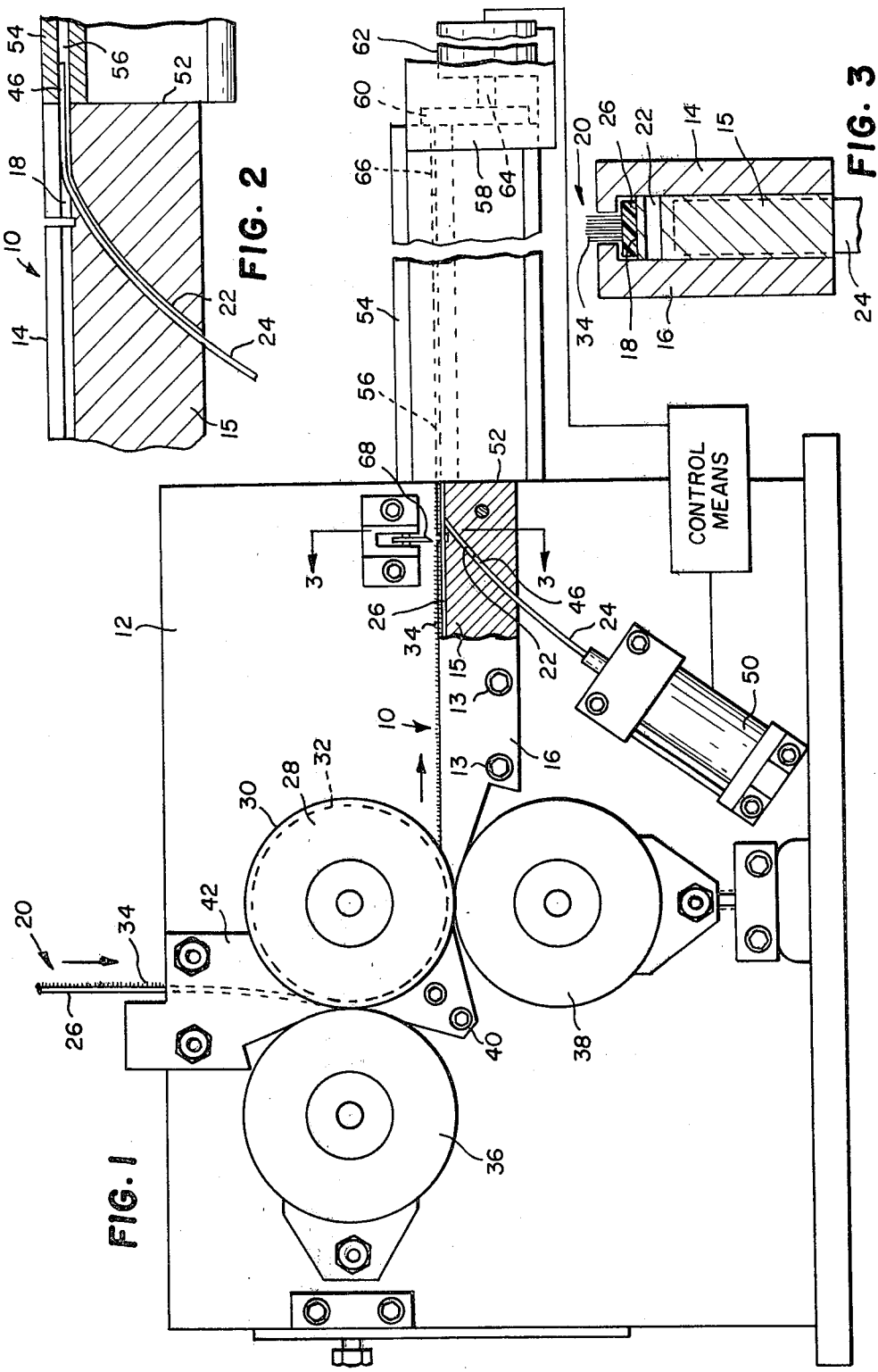

APPARATUS AND METHOD FOR ALIGNING A WEATHERSTRIP GUIDEWAY WITH A RECEIVING SLOT

BACKGROUND OF THE INVENTION

1. Field of the Invention

The present invention relates generally to weatherstripping, and more particularly to an apparatus and method for aligning a weatherstrip guideway with a receiving slot in a receiving member, such as a door or window member, to facilitate insertion of a weatherstrip from the guideway into the receiving slot.

2. Description of the Prior Art

Apparatus is known for inserting a weatherstrip into the receiving slot in a receiving member, such as a door or window member. Such apparatus employs guides and fixtures which must be adjusted to align the receiving slot with the apparatus outlet through which the weatherstrip is fed. Since receiving members may vary in size, cross-sectional shape and the lateral location of the receiving slot, it is necessary to adjust and readjust the guides and fixtures to accurately align the receiving slots with the apparatus outlet. In some instances, special guides and fixtures must be made for aligning the receiving slots of receiving members of different or unusual cross-sectional shapes. To make such adjustments and special guides and fixtures is time consuming and costly.

SUMMARY OF THE INVENTION

It is a primary object of the present invention to provide a novel apparatus and method for easily and accurately aligning a weatherstrip guideway with a receiving slot in a receiving member, such as a door or window member. The apparatus for practicing the method comprises a strip member extendable from the exit opening of the guideway for insertion into the receiving slot of the receiving member for aligning the guideway and receiving slot. Means are provided for clamping one end of the receiving member against the guideway in the aligned position. The strip member is retracted from the guideway to present an unobstructed path along which the weatherstrip can be fed from the guideway directly into the receiving slot and to the other end thereof. Cutting means are provided to cut off the inserted weatherstrip.

In a further aspect of the invention, a body member defines or supports the guideway, and further defines a passageway intersecting the guideway along which the strip member is moved. Cylinder means are provided coupled to the strip member for moving the strip member between its extended and retracted positions. The clamping means is cylinder operated for engaging the other end of the receiving member and clamping it against an end surface of the body member. Control means are provided for operating the strip member and clamping cylinders.

The advantages of this invention in all of its aspects is to easily and accurately align a weatherstrip guideway with a receiving slot to facilitate insertion of the weatherstrip into the receiving slot. Such alignment is easily and accurately achieved for receiving members of different cross-sectional shapes without requiring special guides and fixtures for the different shapes. This results in increased cost economy, efficiency and reliability of operation.

The invention and its advantages will become more apparent from the detailed description of the invention presented below.

BRIEF DESCRIPTION OF THE DRAWING

The details of this invention will be described in connection with the accompanying drawing, in which:

FIG. 1 is a side elevational view of a preferred embodiment of the aligning apparatus of this invention with a portion of the cover plate removed to show the strip member in its retracted position;

FIG. 2 is an enlarged segmental view of a portion of the apparatus of FIG. 1 showing the strip member in its extended position; and FIG. 3 is an enlarged section view taken substantially along line 3—3 of FIG. 1.

DETAILED DESCRIPTION OF THE INVENTION

Referring to FIGS. 1–3 of the drawing, the apparatus for practicing the method of this invention comprises a body member 10 mounted on a vertical support frame 12. Body member 10 comprises a base plate 14, a center guideway plate 15, and a cover plate 16 mounted on and secured to frame 12 by bolts 13. The base and cover plates 14, 16 respectively have lips that cooperate with the top of guideway plate 15 to define a horizontal inverted T-shaped guideway 18 (FIG. 3) along which a weatherstrip 20 of inverted T-shaped cross section is fed. Guideway plate 15 further defines a curved passageway 22 that intersects guideway 18. Passageway 22 guides a strip member 24 having a rectangular cross section substantially of the same size as a base 26 of weatherstrip 20.

Feeding means for feeding weatherstrip 20 comprises a drive wheel 28 having a knurled outer periphery 30, and a peripheral slot 32 for receiving and guiding a pile 34 of weatherstrip 20 (FIG. 1). Two idler rollers 36, 38 with smooth surfaced peripheries are spring biased toward drive wheel 28 for urging base 26 of the weatherstrip against knurled drive wheel 28. A guide bracket 40 is interposed between rollers 36, 38 with portions thereof extending into the nips formed by drive wheel 28 and rollers 36, 38 for guiding a weatherstrip 20 driven by wheel 28 around a portion of the wheel and into the entry end of guideway 18. The entry end is formed by portions of base, guideway and cover plates 14, 15 and 16 respectively extending into a nip of driven wheel 28 and roller 38. A pre-guide mechanism 42 designed to accommodate weatherstrip bases 26 of three different widths guides weatherstrip 20 from any suitable roll, not shown, into the nip between drive wheel 28 and roller 36. Drive wheel 28 is driven by any suitable drive motor, not shown, mounted on the opposite side of frame 12. The drive motor is controlled by a power supply and constant pressure push button, not shown, for driving wheel 28 and feeding weatherstrip 20 through guideway 18.

Strip member 24 has a free end portion 46, and its opposite end secured to a piston rod, not shown, of a fluid cylinder 50 secured to frame 12. When fluid cylinder 50 is moved to its extended position as seen in FIG. 2, strip member 24 is advanced along passageway 22 and a portion of guideway 18 until end portion 46 of strip member 24 extends a short distance from an end surface 52 of body member 10. When fluid cylinder 50 is moved to its normal retracted position as seen in FIG.

1, strip member 24 is retracted withdrawing end portion 46 from guideway 18.

A weatherstrip receiving member 54, such as a door or window member, for example, into which a weatherstrip 20 is to be inserted is shown in FIGS. 1 and 2. Receiving member 54 has an inverted T-shaped weatherstrip receiving slot 56 extending along its entire length of substantially the same cross sectional shape as guideway 18.

In the operation of this invention, to insert a weatherstrip 20 into a receiving member 54, strip member 24 is moved to its extended position as seen in FIG. 2, and one end of the receiving member 54 and slot 56 is manually slid onto strip member end portion 46. The opposite end of receiving member 54 is manually placed on an L-shaped cradle 58 which slidably supports a clamp plate 60 having an adjustable stop finger 66. A fluid cylinder 62 is mounted on cradle 58 and has its piston rod 64 secured to clamp plate 60 for moving the plate relative to cradle 58 between clamping and released positions. A control means for fluid cylinders 50, 62, such as a fluid pressure valve system, for example, shown in block diagram form, is actuated causing cylinder 62 to move clamp plate 60 to its clamping position. In this position, receiving member 54 is clamped against end surface 52 with guideway 18 in alignment with receiving slot 56 (FIG. 2), and stop finger 66 extending into slot 56. In timed relation thereto, cylinder 50 moves strip member 24 to its retracted position (FIG. 1) so that the aligned guideway 18 and receiving slot 56 of the clamped receiving member 54 are unobstructed. The push-button control, not shown, for the feeding mechanism is then pressed causing the feeding mechanism to feed a weatherstrip 20 through guideway 18 directly into receiving slot 56 until the leading end thereof engages strip finger 66. A knife 68 pivotally mounted on body member 10 is actuated for cutting off the weatherstrip just before the point of intersection of guideway 18 and passageway 22.

In the clamping position of receiving member 54, stop finger 66 extends into receiving slots 56 a distance equal to the distance between body member end surface 52 and knife 68. Accordingly, when clamp plate 60 is released and receiving member 54 removed, the short section of weatherstrip 20 extending from receiving member 54 can be manually pushed into receiving slot 56 so that the weatherstrip will extend along the entire length of the receiving member.

While a presently preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. An apparatus for aligning a weatherstrip receiving slot in a receiving member such as a door or window member with the exit opening of a guideway through which a weatherstrip is fed comprising:
    a body member having an end surface and defining a guideway along which a weatherstrip is fed, said guideway having an exit opening at said end surface;
    a strip member;
    means for extending said strip member into and along at least a portion of said guideway and through said exit opening to an extended position in which an end portion of said strip member extends a short distance from said end surface for insertion into a weatherstrip receiving slot of a receiving member for aligning said receiving slot with said exit opening of said guideway;
    means for clamping one end of the receiving member against said end surface after said strip end portion is inserted into the receiving slot for holding the receiving slot in alignment with said guideway; and
    means for retracting said strip member from said extended position to a retracted position clear of said guideway whereby said aligned guideway and receiving slot are unobstructed, and in position for a weatherstrip to be fed along said guideway directly into the receiving slot.

2. An apparatus according to claim 1 wherein said guideway is of an inverted T-shaped cross section.

3. An apparatus according to claims 1 or 2 wherein aid strip member extending and retracting means comprises a fluid cylinder coupled to one end of said strip member.

4. An apparatus according to claims 1 or 2 wherein said body member further defines a passageway intersecting said guideway, and said strip member is movable between its extended and retracted positions along said passageway and said portion of said guideway.

5. An apparatus according to claims 1 or 2 wherein said strip member extending and retracting means comprises a fluid cylinder coupled to one end of said strip member, said body member further defines a passageway intersecting said guideway, and said strip member is movable between its extended and retracted positions along said passageway and said portion of said guideway, said receiving member clamping means comprises a fluid operated clamp engaging the opposite end of the receiving member, said apparatus further comprising means for feeding a weatherstrip through said guideway, and control means for operating said strip member extending and retracting means and said clamping means.

6. A method for aligning a weatherstrip receiving slot in a receiving member such as a door or window member with the exit opening of a guideway through which a weatherstrip is fed comprising the steps of:
    extending a strip member along at least a portion of the guideway and through the exit opening of the guideway to an extended position in which the end portion of the strip member extends a short distance from the exit opening;
    sliding a receiving member relative to the strip member with a weatherstrip receiving slot of the receiving member receiving the end portion of the strip member;
    clamping the receiving member against the exit opening of the guideway while the end portion is in the receiving slot whereby the guideway and receiving slot are aligned; and
    retracting the strip member from the guideway whereby the aligned guideway and receiving slot present an unobstructed path along which a weatherstrip can be fed directly into the receiving slot.

7. A method according to claim 6 comprising the step of feeding a weatherstrip along the guideway and through the exit opening directly into the aligned receiving slot.

8. A method according to claim 7 comprising the step of cutting off the weatherstrip after it has been fed into the receiving slot.

* * * * *